(12) United States Patent
Shimauchi et al.

(10) Patent No.: US 9,031,333 B2
(45) Date of Patent: May 12, 2015

(54) IMAGE PROCESSING DEVICE, IMAGE PROCESSING METHOD, AND PROGRAM

(71) Applicant: Sony Corporation, Tokyo (JP)

(72) Inventors: Kazuhiro Shimauchi, Tokyo (JP); Takahiro Sato, Tokyo (JP); Hiroshi Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 13/708,258

(22) Filed: Dec. 7, 2012

(65) Prior Publication Data

US 2013/0156333 A1   Jun. 20, 2013

(30) Foreign Application Priority Data

Dec. 16, 2011   (JP) ................................. 2011-275562

(51) Int. Cl.
*G06K 9/36* (2006.01)
*G06T 9/00* (2006.01)

(52) U.S. Cl.
CPC ........................................ *G06T 9/00* (2013.01)

(58) Field of Classification Search
CPC .... G06T 9/007; G06T 9/00; H04N 19/00545; H04N 19/00775; H04N 19/00078; H04N 19/0009; H04N 19/00157; H04N 19/0026; H04N 19/00278; H04N 19/00751; H04N 19/00757; H04N 19/00884
USPC ......... 382/232, 233, 236, 238, 250, 251, 253, 382/274; 345/555; 375/240.01, 240.12, 375/240.16, 240.29
See application file for complete search history.

(56) References Cited

U.S. PATENT DOCUMENTS 6,668,086 B1 * 12/2003 Enokida ........................ 382/233
2002/0006227 A1 * 1/2002 Takemura ..................... 382/232

FOREIGN PATENT DOCUMENTS

JP         3357468         10/2002

* cited by examiner

*Primary Examiner* — Ali Bayat
(74) *Attorney, Agent, or Firm* — Oblon, McClelland, Maier & Neustadt, L.L.P.

(57) ABSTRACT

An image processing device which includes an encoding processing unit which generates a data stream in which markers denoting segmentation of image encoding processing are inserted, and a marker information generation unit which generates marker information which is provided with position information denoting a position in the data stream of a selected marker with a predetermined marker thinning-out interval from the markers which are inserted.

14 Claims, 14 Drawing Sheets

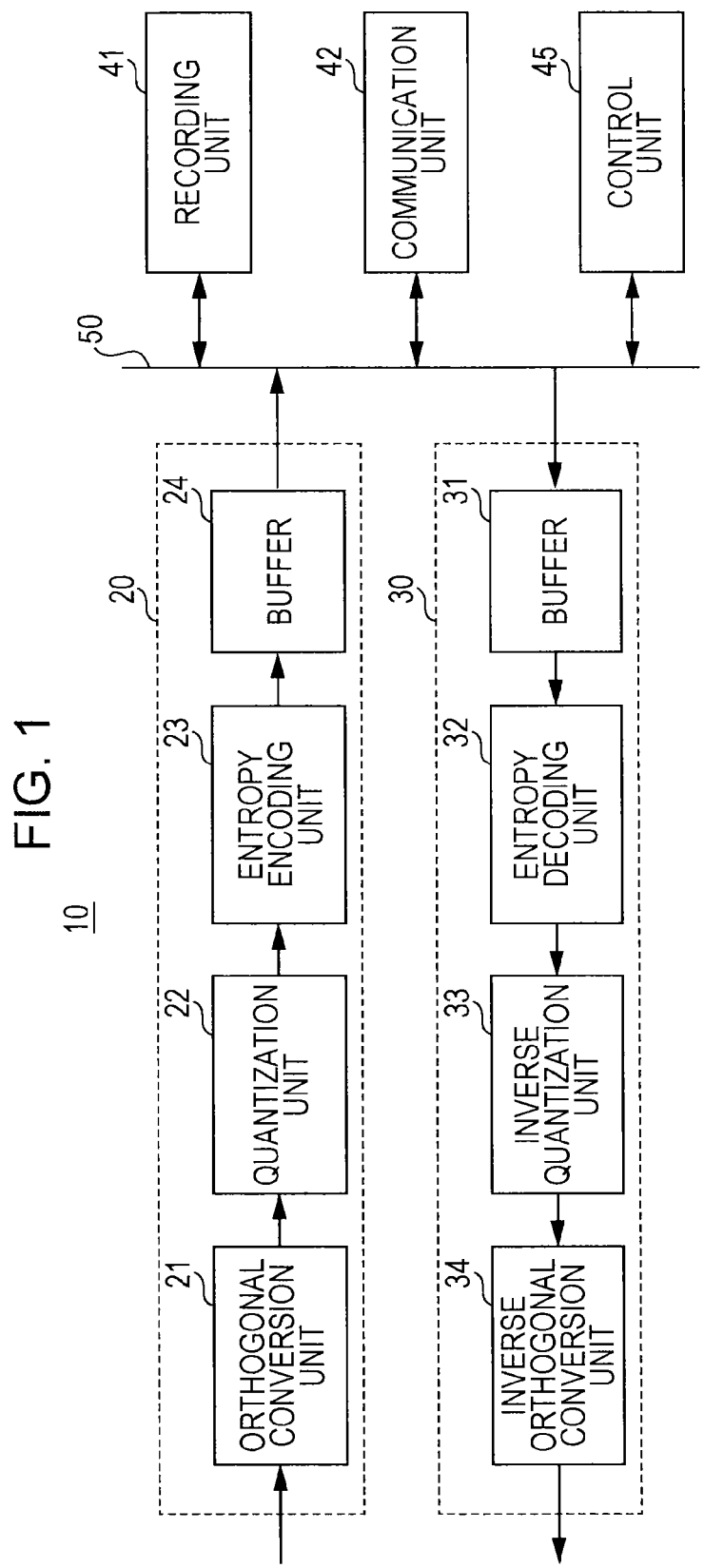

FIG. 3A
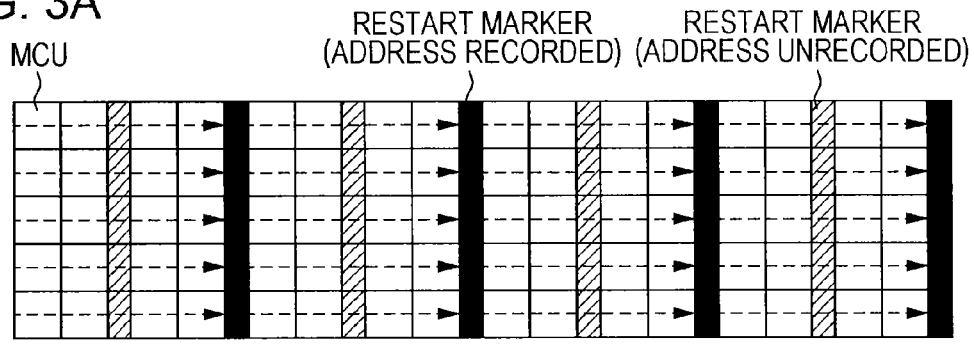
FIG. 3B
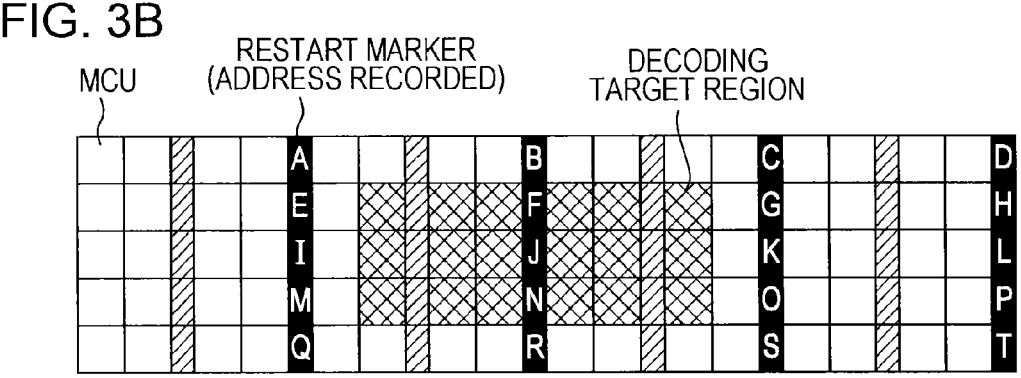
FIG. 3C
IN CASE OF RASTER ORDER
A, B, C, D, Ⓔ, F, G, H, Ⓘ, J, K, L, Ⓜ, N, O, P, Q, R, S, T
FIG. 3D
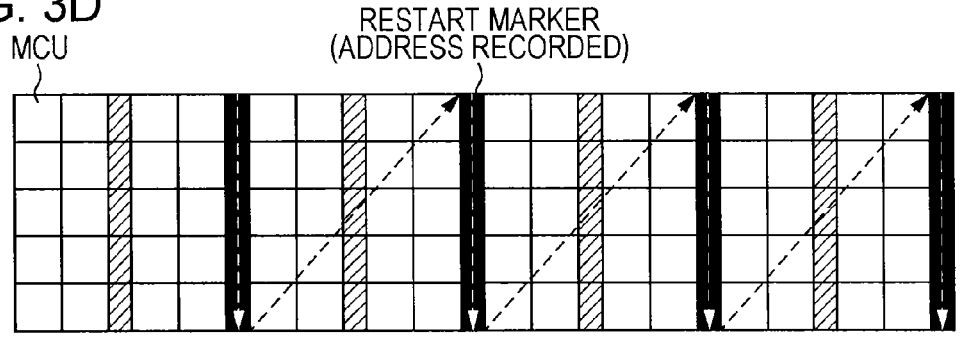
FIG. 3E
IN CASE OF VERTICAL DIRECTION
A, Ⓔ, Ⓘ, Ⓜ, Q, B, F, J, N, R, C, G, K, O, S, D, H, L, P, T

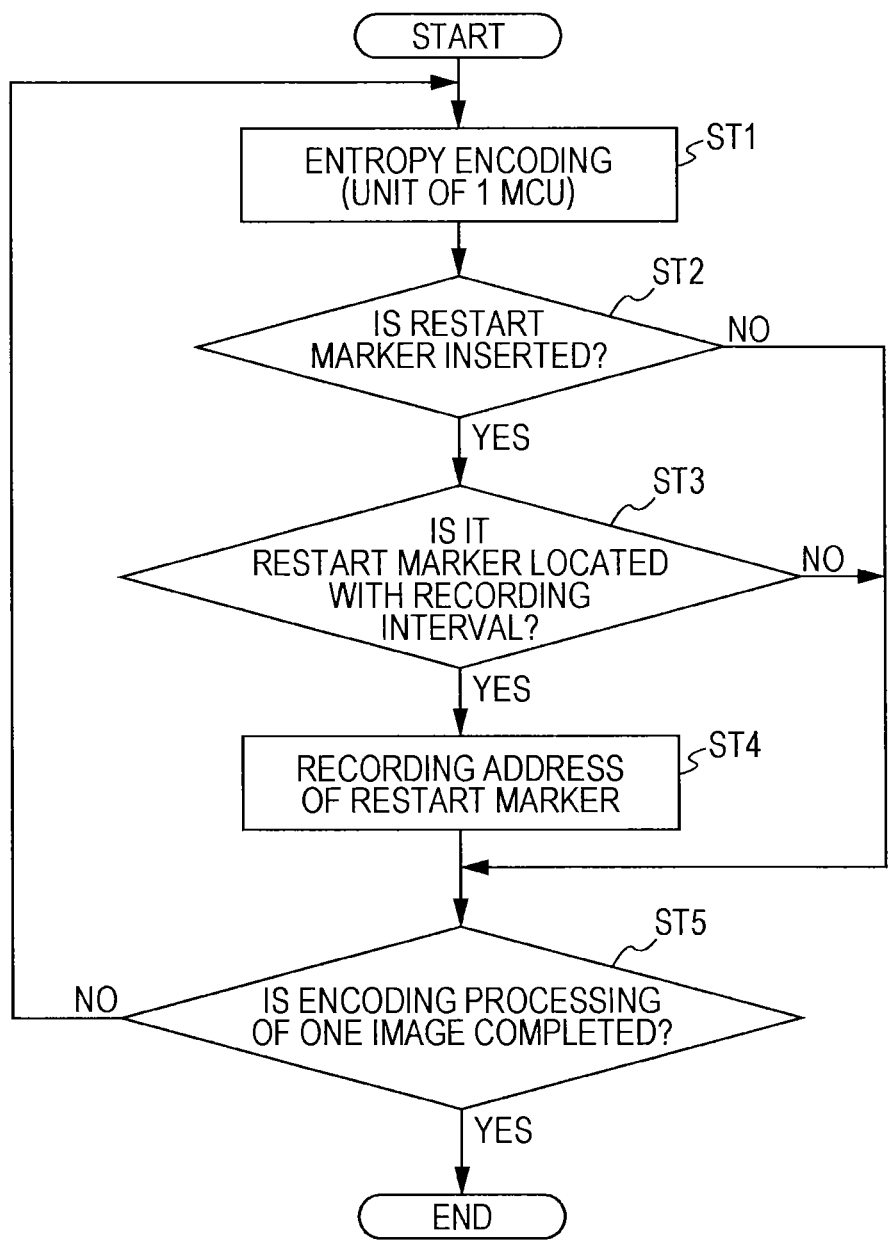

IMAGE PROCESSING DEVICE, IMAGE PROCESSING METHOD, AND PROGRAM

BACKGROUND

The present technology relates to an image processing device, an image processing method, and a program. Specifically, it is possible to perform a reduction of information relating to an address of a marker denoting segmentation of encoding processing, or efficient reading out of information.

In the related art, in an imaging device such as a digital camera, a color still image encoding method of the JPEG (Joint Photographic Experts Group) standard (ISO DIS-8) has been used as encoding processing of an image signal of an imaging result. In JPEG, image data is performed with encoding processing in block units, and it is possible to insert a marker (for example, a restart marker) denoting segmentation of encoding processing in each block. Accordingly, when a restart maker is inserted into a data stream, it is possible to perform decoding processing in the middle of the data stream, and to perform decoding processing with respect to only the data stream corresponding to a desired region without performing decoding with respect to all of the data streams of one image.

In addition, according to Japanese Patent No. 3357468, it is possible to directly access a restart marker which is necessary for reproducing an image in a desired region by maintaining the address of the restart marker in a data stream as a table.

SUMMARY

Meanwhile, in a case of generating a data stream in which a restart marker is inserted, the total number of restart markers increases, when the restart marker is inserted with a short interval, or the image size (number of pixels) becomes large. For this reason, when the addresses of the restart markers are maintained as a table, the amount of data of the table becomes enormous.

It is desirable to provide an image processing device, an image processing method, and a program which are able to reduce the position information of a marker denoting segmentation of encoding processing of an image in a data stream, or to efficiently perform decoding processing.

According to a first embodiment of the present technology, there is provided an image processing device which includes an encoding processing unit which generates a data stream in which markers denoting segmentation of image encoding processing are inserted, and a marker information generation unit which generates marker information which is provided with position information denoting a position in the data stream of a selected marker with a predetermined marker thinning-out interval from the markers which are inserted.

In the technology, a data stream in which, for example, a restart marker denoting segmentation of image encoding processing is inserted is generated. In addition, an address of a marker which is selected in a predetermined marker thinning-out interval from the inserted markers in a data stream, or a thinning-out parameter denoting the marker thinning-out interval is generated as marker information. In the thinning-out of the restart markers, for example, the marker thinning-out interval is set so that the selected markers are aligned in the vertical direction. In addition, the selected markers are aligned in order in the vertical direction, and position information denoting addresses of the selected markers is provided as marker information, using the order of the markers. The generated marker information is connected to the data stream. Alternatively, the generated information denoting a location of a file of the marker information is included in the data stream as a separate file from the data stream. In addition, information denoting whether or not the marker thinning-out interval can be changed is provided to the marker information by setting the marker thinning-out interval of the restart marker to be changeable.

According to a second embodiment of the technology, there is provided an image processing method which includes generating a data stream in which markers denoting segmentation of image encoding processing are inserted, and generating marker information in which position information denoting a position of a marker which is selected from the inserted markers with a predetermined marker thinning-out interval in the data stream.

According to a third embodiment of the technology, there is provided a program causing a computer to execute a procedure of generating a data stream in which markers denoting segmentation of image encoding processing are inserted, and a procedure of generating marker information which is provided with position information denoting a position of a marker which is selected from the inserted markers with a predetermined marker thinning-out interval is provided in the data stream.

According to a fourth embodiment of the technology, there is provided an image processing device which includes a marker information processing unit which specifies segmentation of a data stream which is necessary for obtaining a decoding image in a decoding target region based on marker information which is provided with position information denoting a position in the data stream with respect to a marker which is selected with a predetermined marker thinning-out interval in the data stream in which a marker denoting segmentation of image encoding processing is inserted, and a decoding processing unit which performs decoding of a data stream which is necessary for obtaining the decoding image using the specified marker, and cuts out an image in the decoding target region from the obtained decoding image.

In the technology, the marker denoting the segmentation of the data stream which is necessary for obtaining decoding image in the decoding target region is specified based on the marker information which is provided with position information denoting the position in the data stream with respect to the marker which is selected with the predetermined marker thinning-out interval in the data stream in which the markers denoting the segmentation of image encoding processing are inserted. In addition, decoding is performed only for the data stream which is necessary for performing decoding in the decoding target region using the specified marker, and the image in the decoding target region is cut out from the obtained decoding image. In addition, a marker which is closer to the decoding target region than the specified marker is searched for from non-selected marker based on an address of the selected marker, and the marker information denoting the marker thinning-out interval, and when a marker which is close to the decoding target region is detected, the specified marker is changed into a detected marker, and decoding only for the data stream which is necessary for performing decoding in the decoding target region using the changed marker.

According to a fifth embodiment of the technology, there is provided a method of image processing which includes specifying a marker denoting segmentation of a data stream which is necessary for obtaining a decoding image in a decoding target region based on marker information which is provided with position information denoting a position in the data stream with respect to a marker which is selected with a predetermined marker thinning-out interval in a data stream in which markers denoting segmentation of image encoding processing are inserted, and cutting out an image in the decoding target region from an obtained decoding image by performing decoding only for a data stream which is necessary for obtaining a decoding image in the decoding target region using the specified marker.

According to a sixth embodiment of the technology, there is provided a program which causes a computer to execute decoding of a data stream, procedures of specifying a marker denoting a segmentation of a data stream which is necessary for obtaining a decoding image in a decoding target region based on marker information which is provided with position information denoting a position in a data stream with respect to a marker which is selected with a predetermined marker thinning-out interval in a data stream in which markers denoting segmentation of image encoding processing are inserted, and cutting out an image in the decoding target region from an obtained decoding image by performing decoding only for a data stream which is necessary for performing decoding in the decoding target region using the specified marker.

In addition, the program according to the present technology is a program which can be provided using a storage medium, or a communication medium which is provided in a computer readable format with respect to a general-purpose computer in which, for example, a variety of programming codes can be executed. There is, for example, a storage medium such as an optical disc, a magnetic disk, a semiconductor memory or the like, or a communication medium such as a network. Processing according to a program can be realized on a computer by providing such a program in a computer readable format.

According to such a technology, marker information in which a data stream in which markers denoting segmentation of image encoding processing are inserted, and position information denoting a position in a data stream of a marker which is selected with a predetermined marker thinning-out interval from the inserted markers is provided is generated at the time of image encoding. In addition, when an image in a desired decoding target region is generated at the time of image decoding, a marker denoting segmentation of a data stream which is necessary for obtaining a decoding image in the decoding target region is specified based on marker information, only the data stream which is necessary for performing decoding in the decoding target region is performed using the specified marker, and an image in the decoding target region is cut out from an obtained partial decoding image. In this manner, since it is possible to generate an image in the desired decoding target region without using information denoting the position in the data stream of each marker which is inserted in the data stream, information denoting the position of the marker in the data stream can be reduced. In addition, it is possible to perform efficient decoding processing, since the marker denoting the segmentation of the data stream which is necessary for obtaining the decoding image in the decoding target region is specified, and decoding only for the data stream which is necessary for obtaining the decoding image in the decoding target region is performed using the specified marker.

BRIEF DESCRIPTION OF THE DRAWINGS

FIG. 1 is a diagram which illustrates a configuration of an image processing device.

FIGS. 3A to 3E are diagrams which illustrate a recording order of addresses.

FIG. 4 is a flowchart which illustrates a thinning-out operation of address recording of the restart marker in an entropy encoding unit.

FIGS. 5A to 5C are diagrams which exemplify formatting.

DETAILED DESCRIPTION OF EMBODIMENTS

Figure 2A:
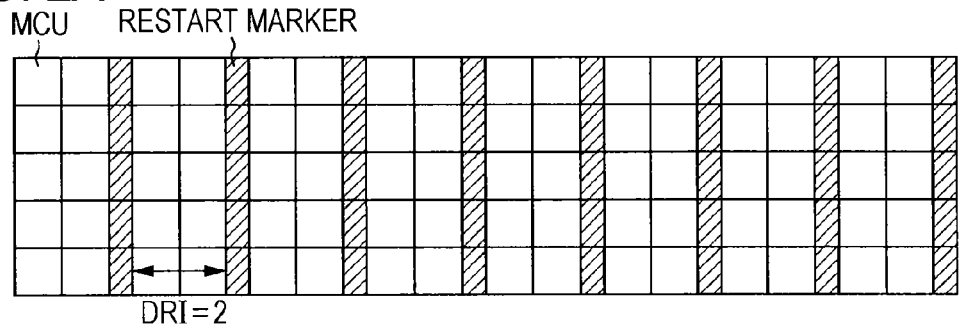
FIGS. 2A to 2D are diagrams which illustrate thinning-out of address recording of a restart marker.

Hereinafter, embodiments of the present technology will be described. In addition, descriptions will be made in the following order.

1. Configuration of image processing device
2. First operation of image processing device
3. Second operation of image processing device
4. Third operation of image processing device
5. Fourth operation of image processing device
6. Fifth operation of image processing device 1. Configuration of Image Processing Device FIG. 1 exemplifies a configuration of an image processing device. An image processing device 10 includes an encoding processing unit 20, a decoding processing unit 30, a recording unit 41, a communication unit 42, and a control unit 45. In addition, each unit is connected to each other through a bus 50.

The encoding processing unit 20 is configured by an orthogonal conversion unit 21, a quantization unit 22, an entropy encoding unit 23, and a buffer 24. The decoding processing unit 30 is configured by a buffer 31, an entropy decoding unit 32, an inverse quantization unit 33, and an inverse orthogonal conversion unit 34.

In the encoding processing unit 20, a luminance signal, and a color difference signal are input as an input image signal. The orthogonal conversion unit 21 of the encoding processing unit 20 divides the input image signal into blocks of a predetermined number of images. The orthogonal conversion unit 21 performs transformation of an image signal in block units, for example, two dimensional DCT (discrete cosine) transformation, and outputs an orthogonal conversion coefficient of a direct current (DC) component and an alternating current (AC) component thereof to the quantization unit 22.

The quantization unit 22 performs quantization of the orthogonal conversion coefficient which is supplied from the orthogonal conversion unit 21. The quantization unit 22 outputs quantization data which is generated by performing quantization of the orthogonal conversion coefficient to the entropy encoding unit 23.

The entropy encoding unit 23 generates encoding data by performing encoding of the quantization data which is supplied from the quantization unit 22. The entropy encoding unit 23 performs encoding of the quantization data using, for example, Huffman encoding, and outputs the generated encoding data to the buffer 24.

The buffer 24 is a memory which temporarily stores and outputs encoding data. The encoding data which is output from the buffer 24 is supplied to the recording unit 41, the communication unit 42, or the like through the bus 50 as a data stream.

The buffer 31 of the decoding processing unit 30 is a memory which temporarily stores the data stream which is read out from the recording unit 41, and supplied through the bus 50, and the data stream which is supplied from the communication unit 42 through the bus 50, and output to the entropy decoding unit 32.

The entropy decoding unit 32 generates decoding data by performing decoding of the data stream which is supplied from the buffer 31. The entropy decoding unit 32 performs decoding processing using a method corresponding to encoding which is performed in the entropy encoding unit 23, and outputs the generated decoding data to the inverse quantization unit 33.

The inverse quantization unit 33 performs inverse quantization of the decoding data which is supplied from the entropy decoding unit 32, and generates coefficient data. The inverse quantization unit 33 performs the inverse quantization using a method corresponding to the quantization which is performed in the quantization unit 22, and outputs the generated coefficient data to the inverse orthogonal conversion unit 34.

The inverse orthogonal conversion unit 34 performs inverse orthogonal conversion of the coefficient data which is supplied from the inverse quantization unit 33, and generates image data. The inverse orthogonal conversion unit 34 performs inverse orthogonal conversion corresponding to the orthogonal conversion which is performed in the orthogonal conversion unit 21, and generates and outputs image data.

The recording unit 41 is configured by a recording medium, for example, such as an optical disc, a magneto-optical disc, a magnetic disk, or a memory card. The recording unit 41 records a data stream which is generated in the encoding processing unit 20, or a data stream which is received in the communication unit 42 on the recording medium. In addition, the recording unit 41 reads out the data stream which is recorded on the recording medium, and outputs to the decoding processing unit 30, or the communication unit 42. Further, the recording unit 41 is caused to store various data items, as well, not only the data stream.

The communication unit 42 performs communicating with an external device through a communication line, transmitting of the data stream or the like to the external device, and receiving of commands supplied from the external device, a data stream, or the like.

The control unit 45 is connected to the encoding processing unit 20, the decoding processing unit 30, the recording unit 41, and the communication unit 42 through the bus 50. The control unit 45 performs encoding processing of image data, decoding processing of a data stream, communicating of the data stream, or the like, by controlling each unit.

In addition, in the image processing device 10, marker information is generated which is provided with position information denoting the position in the data stream of a marker which is selected from markers which are inserted in the data stream, and denotes segmentation of image encoding processing, for example, the restart markers which are inserted in a data stream of the JPEG standard, and denote segmentation of the image encoding processing with a predetermined marker thinning-out interval. In addition, the image processing device 10 provides information denoting a marker thinning-out interval to the marker information. The generation of the marker information is performed, for example, in the entropy encoding unit 23, the control unit 45, or the like. In addition, the generated marker information may be connected to a data stream, or may be set as a separate file by being correlated with the data stream.

Further, in the image processing device 10, a restart marker denoting segmentation of the data stream which is necessary for obtaining a decoding image in the decoding target region based on the marker information is specified. Specifying of the restart marker is performed, for example, in the entropy decoding unit 32, the control unit 45, or the like. In addition, in the decoding processing unit 30, partial decoding processing of a data stream which is continuous to the specified restart marker is performed, as described later.

2. First Operation of Image Processing Device

A first operation of the image processing device 10 which is configured in this manner will be described. The first operation is an operation in a case in which a function of inserting the restart marker, and a function of generating the marker information are provided in the entropy encoding unit 23. In addition, the first operation is an operation in a case in which a function of specifying the marker denoting the segmentation of the data stream which is necessary for obtaining the decoding image in the decoding target region is provided in the entropy decoding unit 32.

In the data stream of the JPEG standard, an encoded value is denoted in a leading minimum coded unit (MCU), and the difference between the immediately previous MCU is denoted in the MCU thereafter. For this reason, when data omissions or errors occur during processing, it is difficult to correctly decode the data thereafter. For this reason, the restart marker denoting the segmentation of the encoding and decoding processes is inserted between the MCU in order to prevent the influence of data omission or errors from spreading. In addition, a restart interval DRI (Define Restart Interval) denoting an insertion interval of the restart marker is provided in front of the encoding data of the MCU.

Operation of Encoding Processing Unit

Figure 2B:
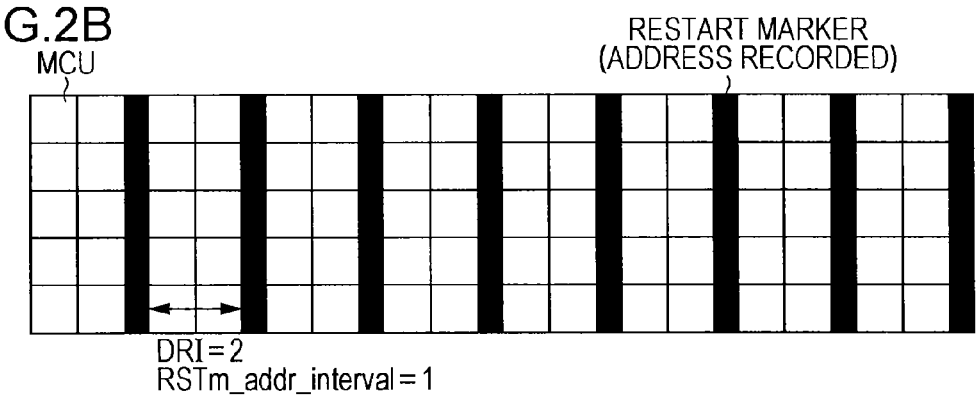
Figure 2C:
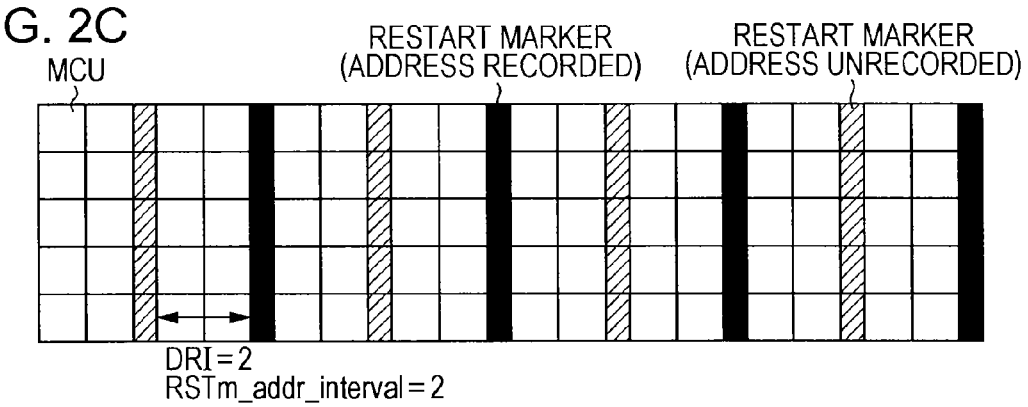
Figure 2D:
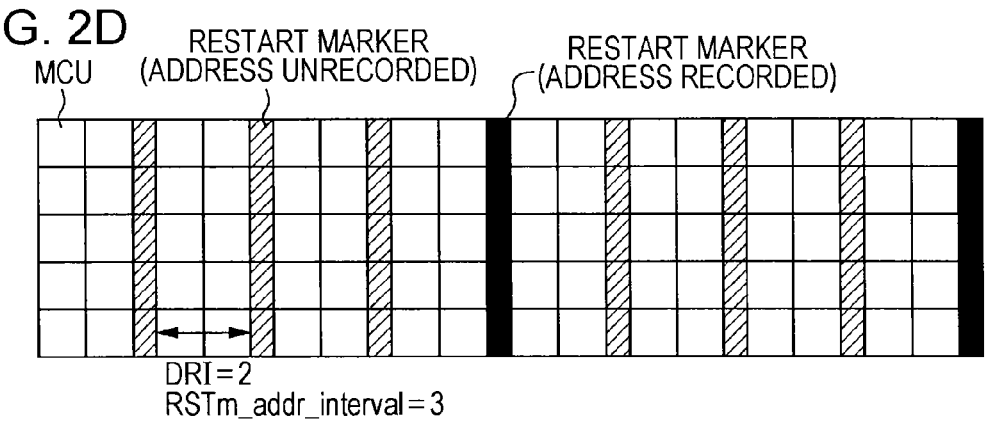

Subsequently, in the entropy encoding unit 23, when recording position information of the restart marker in the data stream, for example, when an address is recorded, thinning-out of address recording of the restart marker is performed. That is, the entropy encoding unit 23 performs address recording of a marker which is selected with a predetermined marker thinning-out interval from the inserted restart marker, and reduces position information of the restart marker. FIGS. 2A to 2D denote thinning-out of address recording of a restart marker. For example, when it is set to restart interval DRI=2, as shown in FIG. 2A, a restart marker is inserted in every other two MCUs. In addition, shaded portions are restart markers. In FIGS. 2B to 2D, restart markers in which addresses are recorded are denoted. In addition, black portions are restart markers in which addresses are recorded. That is, in FIG. 2B, all of the inserted restart markers are recorded with addresses. In addition, the address recording of the restart marker is performed every other time in FIG. 2C, and every fourth time in FIG. 2D.

In this manner, according to the present technology, it is possible to prevent position information relating to markers from increasing by only using position information of a marker which is selected with a predetermined marker thinning-out interval from markers inserted in data streams.

Further, in order to make a thinning-out state when performing a marker selection using decoding processing be determined, a thinning parameter (RSTm_addr_interval) denoting a marker thinning-out interval is generated in the encoding processing. For example, in FIG. 2A, a case in which the thinning parameter is set to RSTm_addr_interval=0 is denoted. In addition, cases in which the thinning parameter is set to RSTm_addr_interval=1 in FIG. 2B, set to RSTm_addr_interval=2 in FIG. 2C, and set to RSTm_addr_interval=4 in FIG. 2D are denoted. In this manner, it is possible to determine in what marker thinning-out interval a marker in which position information is denoted is selected from markers which are inserted in a data stream by generating the thinning parameter, at the time of decoding processing.

FIGS. 3A to 3E denote a recording order of addresses. When the addresses are recorded in order according to JPEG encoding, addresses of the restart markers become the raster order as shown in FIG. 3A.

Here, as shown in FIG. 3B, when an image of MCU which is denoted using cross-hatching is generated using the decoding processing, it is necessary for the image processing device 10 to perform decoding processing up to the MCUs at the right end of the decoding target region from the MCUs which are continuous to the restart marker E, I, and M. Here, when the addresses of the restart markers are recorded in raster order as shown in FIG. 3A, the addresses of the necessary restart markers are discretely present as shown in circles in FIG. 3C. Accordingly, reading out of the address becomes ineffective when considering memory access.

Therefore, when encoding of one screen is completed, the order of addresses may be recorded by being realigned in the vertical direction as shown in FIG. 3D. In this manner, when the addresses of the markers are recorded in this order using the vertical order in which selected markers using the predetermined marker thinning-out interval are aligned, the addresses of the necessary restart markers E, I, and M are in a continuous state as shown in circles in FIG. 3E. Accordingly, it is possible for the image processing device 10 to obtain necessary addresses, and perform decoding processing efficiently by performing reading out of continuous addresses only once. In addition, the marker information may be recorded after reducing the data amount by performing some kind of compression.

FIG. 4 is a flowchart which denotes a thinning-out operation of the address recording of the restart marker in the entropy encoding unit 23.

In step ST1, the entropy encoding unit 23 performs entropy encoding. The entropy encoding unit 23 performs the entropy encoding in units of 1 MCU, and proceeds to step ST2.

In step ST2, the entropy encoding unit 23 determines whether the restart marker is inserted. The entropy encoding unit 23 performs inserting of the restart marker with the restart interval DRI, proceeds to step ST3 when the restart marker is inserted, and proceeds to step ST5 when the restart marker is not inserted.

In step ST3, the entropy encoding unit 23 determines whether or not it is the restart marker located with a recording interval. The entropy encoding unit 23 proceeds to step ST4 when the inserted restart marker is located with the recording interval (marker thinning-out interval) corresponding to the thinning-out parameter, and proceeds to step ST5 when the restart marker is not located with the recording interval. For example, as shown in FIG. 2D, if the thinning-out parameter is set to RSTm_addr_interval=4, when the inserted restart marker is located at the black portion, the process proceeds to step ST4, and when the inserted restart marker is located at the shaded portion, the process proceeds to step ST5.

In step ST4, the entropy encoding unit 23 records an address of the restart marker. The entropy encoding unit 23 records the address of the inserted restart marker in the buffer 24, and proceeds to step ST5.

In step ST5, the entropy encoding unit 23 determines whether the encoding processing of one image is completed. The entropy encoding unit 23 returns to step ST1 when the encoding processing of one image is not completed, and performs entropy encoding of the next MCU. In addition, the entropy encoding unit 23 completes the processing when the encoding processing of one image is completed.

When such processing is performed in the entropy encoding unit 23, the address and encoding data of the restart marker are recorded in the buffer 24. Accordingly, marker information in which a data stream as encoding data in which a marker denoting a segmentation of image encoding processing is inserted, and position information denoting the position of the marker which is selected with the predetermined marker thinning-out interval from the inserted markers in the data stream is provide are stored in the buffer 24. In addition, the marker information may be provided with information denoting the marker thinning-out interval.

Thereafter, the control unit 45 reads out the data stream and the marker information which are stored in the buffer 24, and causes the recording unit 41 to record them as a data stream in a predetermined format.

Figures 5A, 5B, 5C:
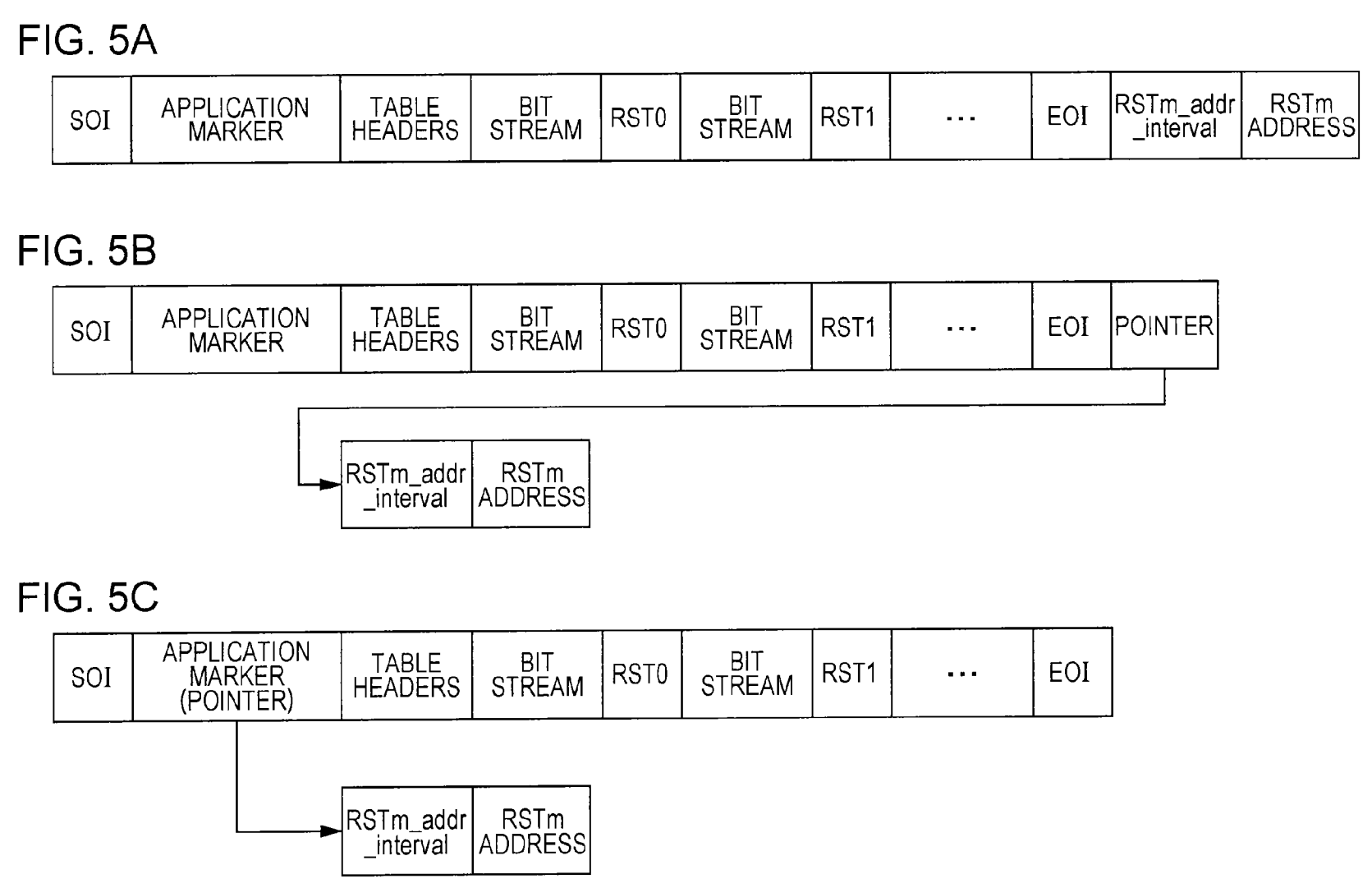

FIGS. 5A to 5C exemplify formats of data streams. In FIGS. 5A to 5C, the top portion of a data stream is provided with an SOI (Start of Image) as the top marker. In addition, an application marker, table headers, a bit stream of encoding data are provided subsequently to the SOI. In addition, the restart marker RST is provided in the middle of the bit stream. An EOI (End of Image) is an ending marker.

The restart marker is a 16-bit code, and the upper order 1 byte is set to "FF", and the lower order 1 byte is set to any of "D0" to "D7". The restart marker is incremented from "D0" to "D7" in each generation, after "D7", it returns to "D0", and then is incremented from "D0" to "D7".

The control unit 45 connects the marker information which is generated in the entropy encoding unit 23, for example, the thinning-out parameter (RSTm_addr_interval) and the address of the restart marker (RSTm_address) to the EOI thereafter, for example, as shown in FIG. 5A. Alternatively, as shown in FIGS. 5B and 5C, it is preferable to make the marker information as a separate file from the data stream. In this case, the separated file can be reference when the data stream is partially performed with the decoding processing by providing a pointer denoting a place of the separate file after the EOI, in the marker application, or the like, and causes the data stream to be associated with the separated file.

Operation of Decoding Processing Unit

Subsequently, operations of the decoding processing unit 30 will be described. The decoding processing unit 30 takes the data stream of one image which is supplied from the recording unit 41 through the bus 50, and the marker information into the buffer 31. The entropy decoding unit 32 of the decoding processing unit 30 determines the position of the restart marker based on the marker information which is taken into the buffer 31, and specifies a restart marker denoting a segmentation of the data stream which is necessary for obtaining a decoding image of a decoding target region. Further, the entropy decoding unit 32 refers to an address of the restart marker which is specified, and reads out only the data stream which is necessary for obtaining the decoding image of the decoding target region from the buffer 31. The decoding processing unit 30 performs decoding processing of the data stream which is read out from the buffer 31 by the entropy decoding unit 32, that is, a partial decoding processing in which a partial image is decoded. The decoding processing unit 30 outputs only image data in the decoding target region from the decoding image data which is obtained using the partial decoding processing. In addition, when the marker information is compressed, the decoding processing is performed after expanding the marker information.

Figure 6:
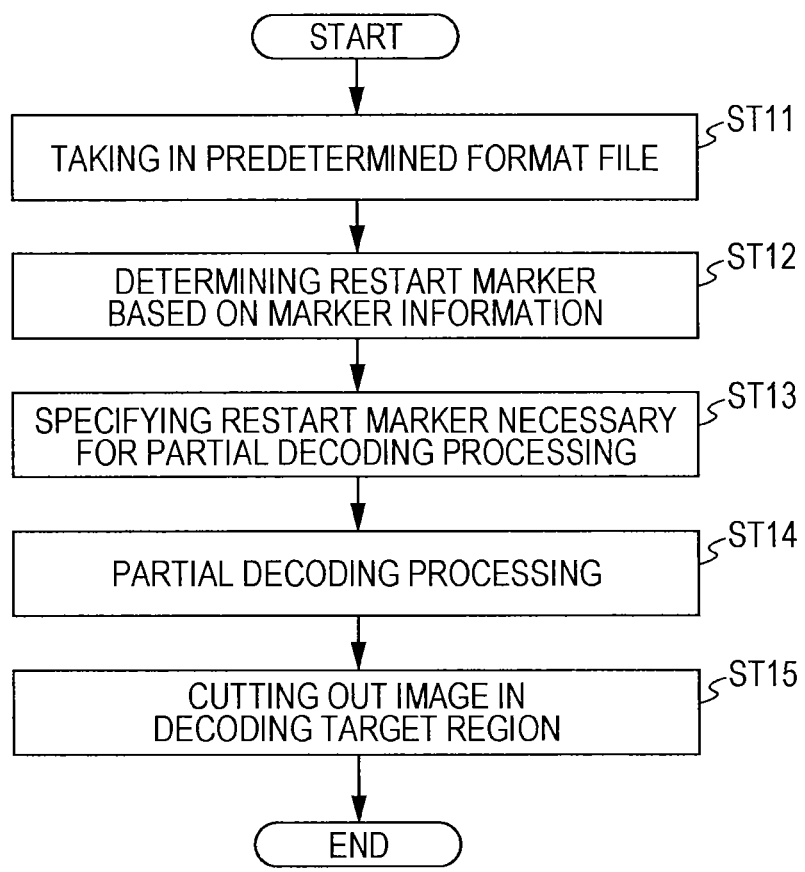
FIG. 6 is a flowchart which illustrates a decoding operation in a decoding target region.

FIG. 6 is a flowchart which illustrates a decoding operation of the decoding target region which is performed in the decoding processing unit 30. In step ST11, the decoding processing unit 30 performs taking-in of a predetermined format file. The decoding processing unit 30 proceeds to step ST12 by taking the predetermined format file, that is, a file of the data stream and the marker information into the buffer 31.

In step ST12, the decoding processing unit 30 determines the restart marker based on the marker information. The entropy decoding unit 32 of the decoding processing unit 30 determines the restart marker of which the address is recorded based on the marker information, and proceeds to step ST13. For example, in a case shown in FIGS. 3A to 3E, positions of the restart markers A to T are determined.

In step ST13, the decoding processing unit 30 specifies a restart marker which is necessary for performing the partial decoding processing. The entropy decoding unit 32 of the decoding processing unit 30 specifies a marker denoting a segmentation of the data stream which is necessary for obtaining the decoding image in the decoding target region, and proceeds to step ST14. For example, when the cross-hatched region shown in FIG. 3B is set to the decoding target region, decoding processing should be performed from the MCU immediately after the restart markers E, I, and M in order to perform decoding processing of the encoding data of MCUs in the decoding target region. This is because, the MCU immediately after the restart markers E, I, and M is denoted with an encode value, and a difference from the MCU immediately before is denoted in the MCU thereafter. Accordingly, the restart marker E, I, and M are specified as the restart markers which are necessary for performing the partial decoding processing with respect to the decoding target region which is shown in FIG. 3B. Here, at which MCU position the restart marker in which address recording is performed is located is determined based on the restart thinning-out interval DRI denoting an inserting interval of the restart marker, and the thinning-out parameter (RSTm_addr_interval). Further, if a restart marker in which address recording of a position which is closer than the MCU of the decoding target region on the left is performed is specified using the determination result, it is possible to specify the restart marker which is necessary for performing the partial decoding processing.

In step ST14, the decoding processing unit 30 performs the partial decoding processing. The decoding processing unit 30 performs decoding processing of encoding data which is continuous to the restart marker which is specified in step ST13, and proceeds to step ST15. For example, decoding processing of the encoding data of the MCUs from the MCU immediately after the restart marker E to the MCU immediately before the restart marker G, from the MCU immediately after the restart marker I to the MCU immediately before the restart marker K, and from the MCU immediately after the restart marker M to the MCU immediately before the restart marker O are performed with respect to the decoding target region which is shown in FIG. 3B.

In step ST15, the decoding processing unit 30 performs cutting out of an image in the decoding target region. The decoding processing unit 30 cuts out an image in the decoding target region from the decoding image which is obtained by performing the partial decoding processing, and outputs an image signal of the cut-out image. For example, the decoding image which is obtained in the partial decoding processing is an image in which the left and right are 1 MCU larger, respectively, than the decoding target region shown in FIG. 3B. Accordingly, the image data in the decoding target region is output by being cut out from the decoding image data which is generated in step ST14.

By performing the processing in this manner, it is possible to obtain the decoding image in the decoding target region without performing decoding processing of one image, and to perform effective decoding processing.

Figure 7:
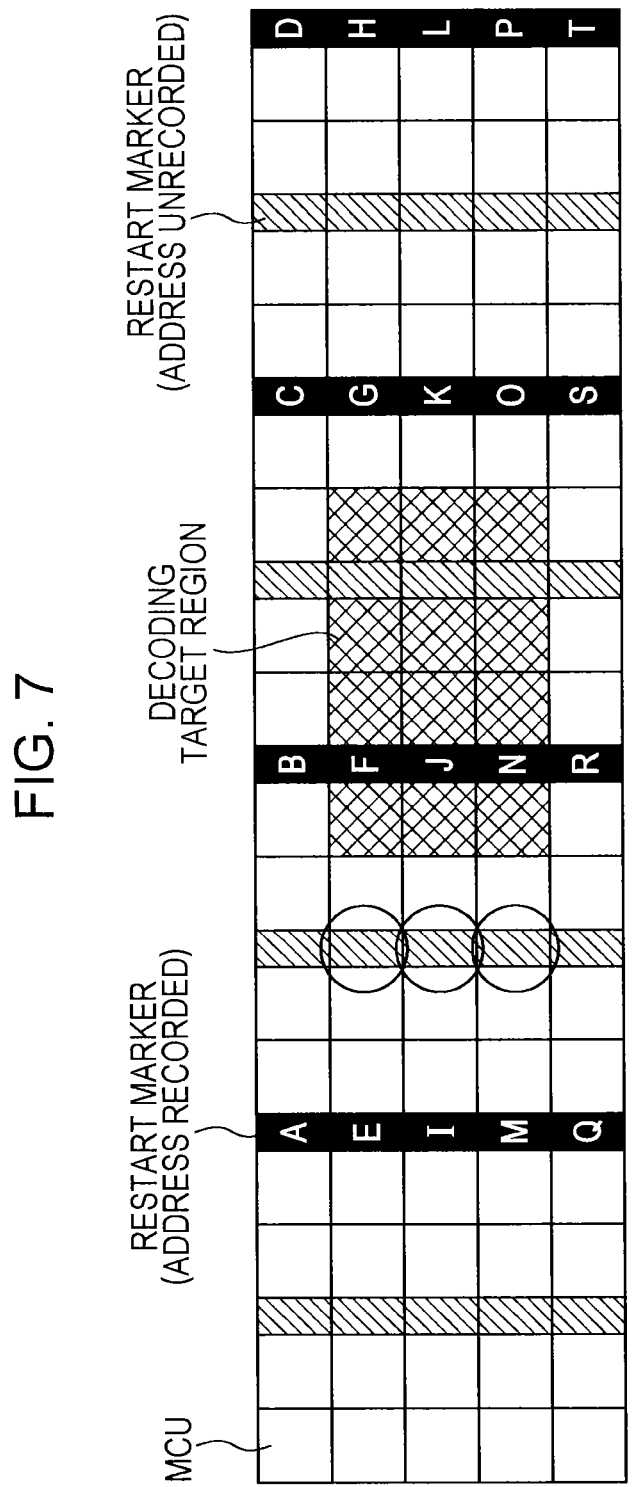
FIG. 7 is a diagram which illustrates a case in which the left end of the decoding target region is separated from a restart marker of which an address is recorded.

Meanwhile, when the left end of the decoding target region is separated from the restart marker in which the address is recorded, unnecessary portions become large in the decoding image after the partial decoding processing. FIG. 7 shows a case in which the left end of the decoding target region is separated from the restart marker in which the address is recorded. In the case shown in FIG. 7, restart markers in which recording of addresses denoting segmentations of the data streams which are necessary for obtaining the decoding image of the decoding target region is performed are restart markers E, I, and M. Accordingly, decoding images of 9 MCU which are located from the restart markers E, I, and M to the decoding target region are unnecessary.

Therefore, when specifying restart markers which are necessary for performing the partial decoding processing, restart markers in which addresses are not recorded can also be used as restart markers which are necessary for performing the partial decoding processing, without limiting to the restart markers in which addresses are recorded. In this case, the thinning-out parameter is also used not only the address of the restart marker.

Figure 8:
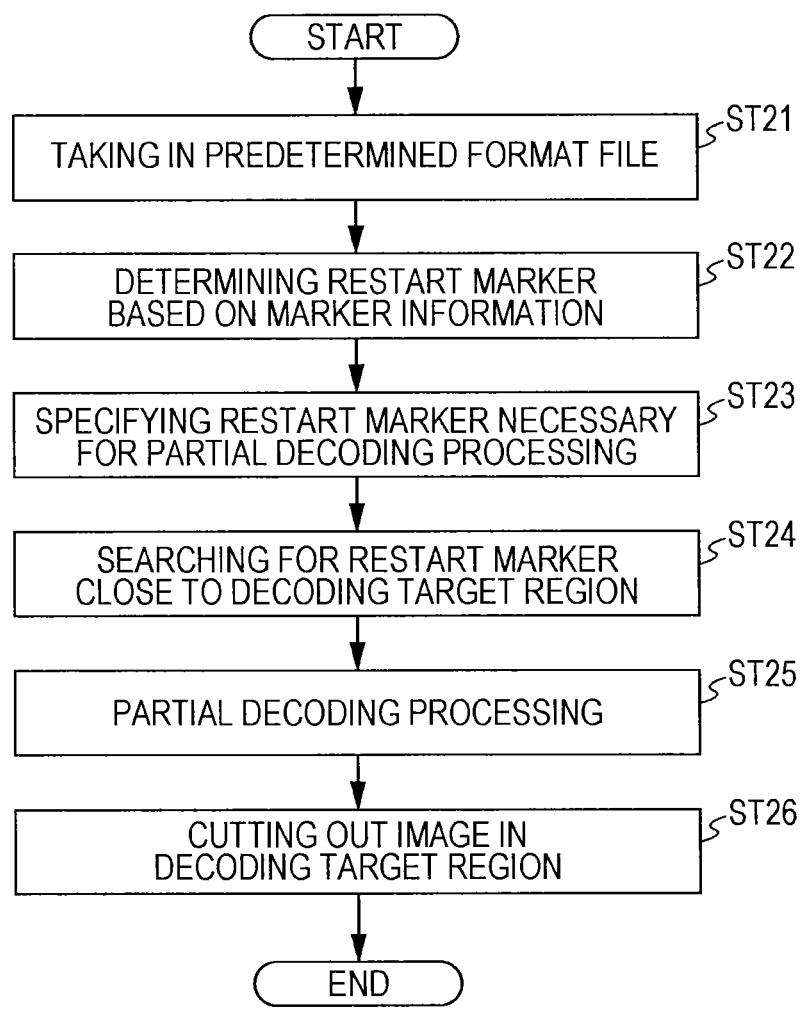
FIG. 8 is a flowchart which illustrates another decoding operation in the decoding target region.

FIG. 8 is a flowchart which illustrates another decoding operation in the decoding target region which is performed in the decoding processing unit 30. In another decoding operation, restart markers in which addresses are not recorded can also be used as candidates of the restart markers which are necessary for the partial decoding processing.

In step ST21, the decoding processing unit 30 performs taking-in of a predetermined format file. The decoding processing unit 30 takes the predetermined format file into the buffer 31, and proceeds to step ST22.

In step ST22, the decoding processing unit 30 determines a restart marker based on the marker information. The decoding processing unit 30 determines the restart marker in which the address is recorded based on the marker information, and proceeds to step ST23.

In step ST23, the decoding processing unit 30 specifies a restart marker which is necessary for the partial decoding processing. The entropy decoding unit 32 of the decoding processing unit 30 specifies a marker denoting a segmentation of the data stream which is necessary for obtaining the decoding image of the decoding target region, and proceeds to step ST24.

In step ST24, the decoding processing unit 30 performs searching for a restart marker which is in the vicinity of the decoding target region. The entropy decoding unit 32 of the decoding processing unit 30 discriminates the restart marker which is specified in step ST23 from a restart marker which is located between the right side of the specified restart marker and the decoding target region, and in which the address is not recorded based on the restart thinning-out interval, or the thinning-out parameter. Further, the entropy decoding unit 32 changes the restart marker which is specified in step ST23 when a restart marker which is closest to the left side of the decoding target region is a restart marker in which the address is not recorded. The entropy decoding unit 32 changes the specified restart marker in step ST23 to the restart marker in which the address is not recorded, and is the closest, and proceeds to step ST25.

In step ST25, the decoding processing unit 30 performs the partial decoding processing. The decoding processing unit 30 determines a data stream in which the partial decoding processing is performed based on the address of the restart marker when the address of the specified restart marker is recorded. In addition, the decoding processing unit 30 searches for a restart marker in which the specified address is not recorded from a position the restart marker in which the address before being changed in step ST24 is recorded when the address of the specified restart marker is not recorded. The decoding processing unit 30 searches for an unrecorded bit stream of the restart marker from the data stream, and determines a data stream for performing the partial decoding processing based on a position of the searched restart marker.

In step ST26, the decoding processing unit 30 performs cutting out of an image in the decoding target region. The decoding processing unit 30 cuts out an image in the decoding target region from the decoding image which is obtained by performing the partial decoding processing, and outputs an image signal of the cut image.

By performing the processing in this manner, when the left end of the decoding target region is separated from the restart marker in which the address is recorded, as shown in FIG. 7, it is possible to perform the partial decoding processing from the restart marker which is in the vicinity of the left end of the decoding target region, and in which the address is not recorded (shown in white circle). Accordingly, it is possible to efficiently perform the partial decoding processing by causing to correspond to the decoding target region.

Figure 9:
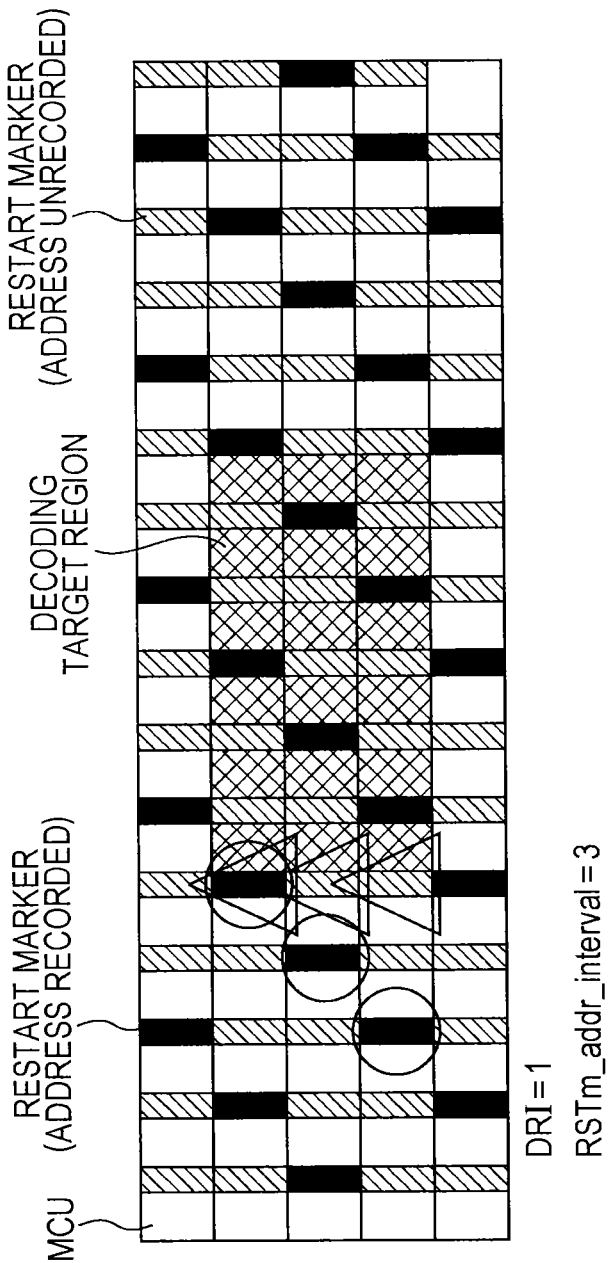
FIG. 9 is a diagram which illustrates a case in which restart markers of which addresses are recorded are not linearly aligned in the vertical direction.

In addition, in the above description, a case has been denoted in which the restart marker in which the address is recorded is linearly aligned in the vertical direction of the image, however, there is a case where the restart marker in which the address is recorded is not linearly aligned in the vertical direction, as shown in FIG. 9, depending on setting of the restart interval DRI, or the thinning-out parameter. In this case, the restart marker which is necessary for the decoding processing may be specified in each MCU group which is set in raster order. For example, a partial decoding processing of which a starting point is set to the white circled restart marker in which the address is recorded, or a partial decoding processing of which the starting point is set to the restart marker in which the address is recorded, and the restart marker in which the address is not recorded may be performed.

3. Second Operation of Image Processing Device

Subsequently, a second operation of the image processing device 10 will be described. The second operation provides a function of inserting the restart marker, and a function of generating the marker information in the control unit 45. In this case, the entropy encoding unit 23 of the image processing device 10 generates encoding data by performing the entropy encoding, and inserting of the restart marker, and causes the buffer 24 to store the data. The control unit 45 searches for the restart marker from the encoding data (data stream) which is stored in the buffer 24, and generates marker information denoting the address of the marker which is selected with the predetermined thinning-out interval from the searched restart marker, or the marker thinning-out interval.

In this case, the data which is output from the encoding processing unit 20 is only the data stream in which the restart marker is inserted, and it is possible to reduce the data amount by the marker information. Accordingly, when transmitting the data stream to the control unit 45 from the encoding processing unit 20, the data transmission load can be reduced compared to the first operation.

Figure 10:
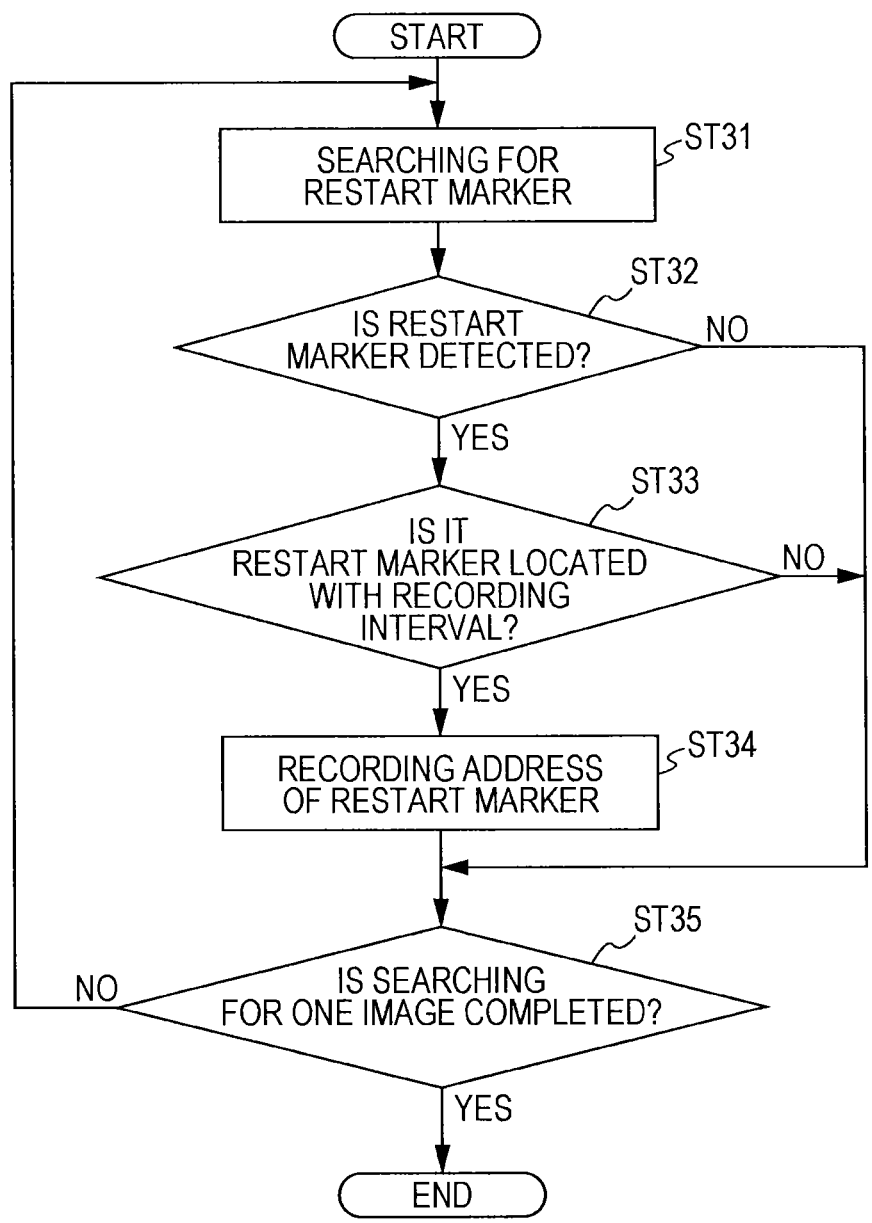
FIG. 10 is a flowchart which illustrates a thinning-out operation of address recording of the restart marker in a control unit.

FIG. 10 is a flowchart which illustrates the thinning-out operation of address recording of the restart marker in the control unit 45.

In step ST31, the control unit 45 starts searching for a restart marker. The control unit 45 performs searching for a restart marker with respect to a data stream which is read out from the encoding processing unit 20, and proceeds to step ST32.

In step ST32, the control unit 45 determines whether or not the restart marker is detected. The control unit 45 proceeds to step ST33 when the restart marker is detected from the data stream, and proceeds to step ST35 when the restart marker is not detected.

In step ST33, the control unit 45 determines whether or not it is the restart marker which is located in a recording interval. The control unit 45 determines whether or not it is the restart marker which is located in the recording interval based on the thinning-out parameter (restart marker selected in marker thinning-out interval). The control unit 45 proceeds to step ST34 when the detected restart marker is the marker located in the recording interval, and proceeds to step ST35 when it is not the marker located in the recording interval.

In step ST34, the control unit 45 records the address of the restart marker. The control unit 45 performs recording of the address of the detected restart marker, since the detected restart marker is the marker located in the recording interval, and proceeds to step ST35.

In step ST35, the control unit 45 determines whether or not searching for an image is completed. The control unit 45 returns to step ST31 when searching for the restart marker with respect to a data stream of an image is not completed, and completes the processing when searching for an image is completed.

By performing the processing in this manner, it is possible to perform address recording of the restart marker by performing thinning-out in the control unit 45, even if address recording of the restart marker is not performed in the entropy encoding unit 23.

4. Third Operation of Image Processing Device

Subsequently, a third operation of the image processing device 10 will be described. The third operation is an operation in which a function of specifying a marker denoting a segmentation of a data stream which is necessary for obtaining a decoding image in a decoding target region is provided in the entropy decoding unit 32 of the decoding processing unit 30. In addition, in the third operation, marker information is read out, and is supplied to the entropy decoding unit 32 in the control unit 45. In addition, the control unit 45 supplies position information of a file denoting a position of a file of the data stream to the entropy decoding unit 32.

In this case, the entropy decoding unit 32 specifies a marker denoting a segmentation of the data stream which is necessary for obtaining the decoding image in the decoding target region based on the supplied marker information. Further, the entropy decoding unit 32 determines a recording position of the data stream which is necessary for obtaining the decoding image from a position of the specified marker, and recording position information for reading out the data stream, performs reading out of the data stream, and performs the partial decoding processing.

In this manner, the marker information is supplied to the entropy decoding unit 32 from the control unit 45, and only the data stream which is necessary for obtaining the decoding image is read out from the recording unit 41. In this case, it is possible to reduce the data transmission load on the decoding processing unit 30 from the recording unit 41 compared to the first operation.

In addition, the restart marker which is located on the right side is also specified in addition to the restart marker which is positioned on the left side of the decoding target region in order to cut out only the data which is necessary for obtaining the decoding image from the data stream. The partial decoding processing is performed using the data stream in a range which is denoted by the specified restart marker.

Figure 11:
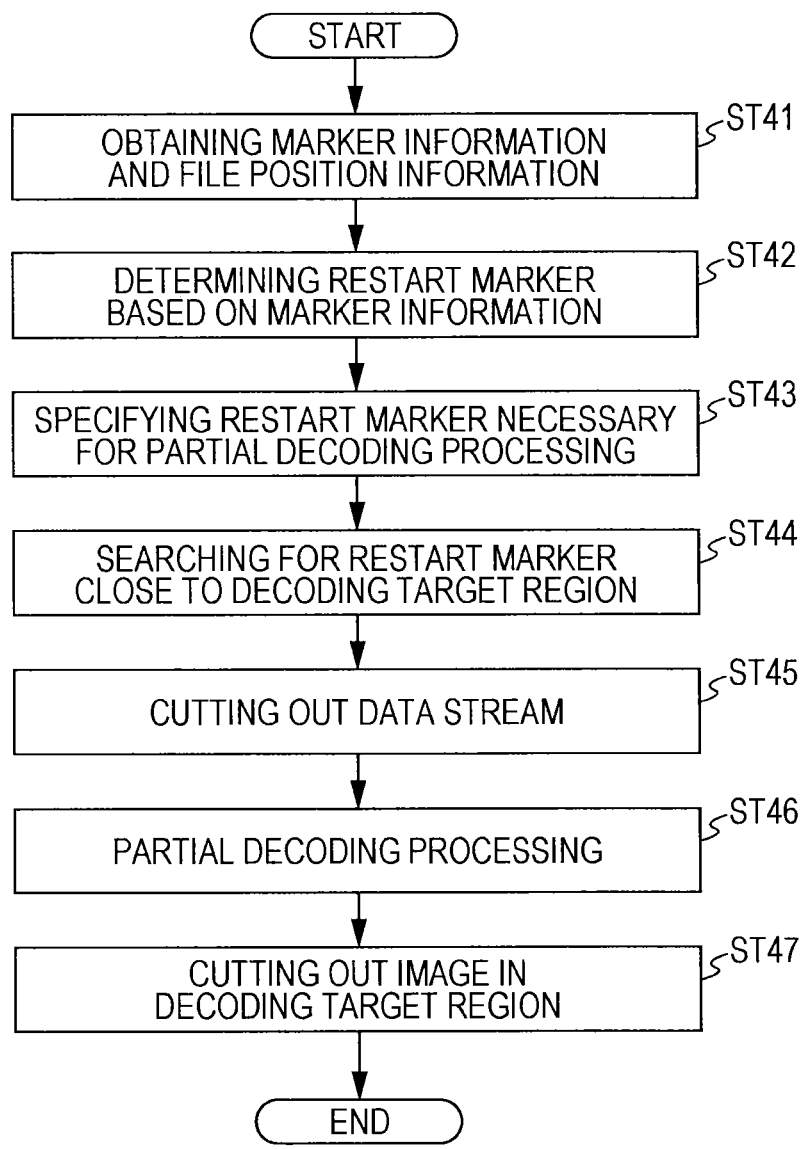
FIG. 11 is a flowchart which illustrates another decoding operation in the decoding target region.

FIG. 11 is a flowchart which illustrates another decoding processing which is performed in the decoding processing unit 30. In step ST41, the decoding processing unit 30 obtains the marker information, and the file position information of the data stream, and proceeds to step ST42.

In step ST42, the decoding processing unit 30 determines the restart marker based on the marker information. The entropy decoding unit 32 of the decoding processing unit 30 determines the restart marker in which the address is recorded based on the marker information, and proceeds to step ST43.

In step ST43, the decoding processing unit 30 specifies the restart marker which is necessary for the partial decoding processing. The entropy decoding unit 32 of the decoding processing unit 30 specifies the marker denoting a segmentation of the data stream which is necessary for obtaining the decoding image in the decoding target region, and proceeds to step ST44. Here, in order to cut out only the necessary data, not only a marker corresponding to the start of the data stream which is necessary, but a marker corresponding to the end is also specified. For example, the restart marker which is located on the right side of the decoding target region, and in which the address is recorded is specified as a segmentation of the data stream.

In step ST44, the decoding processing unit 30 searches for a restart marker which is in the vicinity of the decoding target region. The entropy decoding unit 32 of the decoding processing unit 30 discriminates the restart marker which is specified in step ST43 from a restart marker which is located on the right side of the restart marker which is specified on the start side of the data stream, and in which the address is not recorded based on the restart interval, or the thinning-out parameter. In addition, a restart marker which is located on the left side of the restart marker which is specified on the end side of the data stream, and in which the address is not recorded is determined. Further, the entropy decoding unit 32 changes the restart marker which is specified in step ST43, when the restart marker which is located on the left side of the decoding target region, and is the closest is the restart marker in which the address is not recorded. The entropy decoding unit 32 changes the restart marker which is specified in step ST43 to the restart marker which is the closest, and proceeds to step ST45.

In step ST45, the decoding processing unit 30 performs cutting out of the data stream. The decoding processing unit 30 cuts out the data stream which performs the partial decoding processing based on the specified restart marker, and proceeds to step ST46.

In step ST46, the decoding processing unit 30 performs the partial decoding processing. The decoding processing unit 30 performs the decoding processing of the data stream which is cut out in step ST45, and proceeds to step ST47.

In step ST47, the decoding processing unit 30 performs cutting out of an image in the decoding target region. The decoding processing unit 30 cuts out the image in the decoding target region from the decoding image which is obtained by performing the partial decoding processing, and outputs an image signal of the cut out image.

Since it is possible to perform decoding by cutting out only the data stream which is used in the partial decoding processing by performing such processing, the transmission load of the data stream can be reduced compared to the first operation.

5. Fourth Operation of Image Processing Device

Subsequently, a fourth operation of the image processing device 10 will be described. The fourth operation is an operation in a case in which a function of specifying a marker denoting a segmentation of the data stream which is necessary for obtaining the decoding image of the decoding target region is provided in the control unit 45.

In this case, the control unit 45 specifies a marker denoting the segmentation of the data stream which is necessary for obtaining the decoding image of the decoding target region based on the marker information. Further, the control unit 45 determines a recording position of the data stream which is necessary for obtaining the decoding image from the recording position information for reading out a position of the specified marker, and the data stream, and performs cutting out of the data stream. The control unit 45 supplies the cut out data stream to the decoding processing unit 30.

The decoding processing unit 30 performs the partial decoding processing as the decoding processing of the data stream which is supplied from the control unit 45, cuts out an image in the decoding target region from the decoding image which is obtained by performing the partial decoding processing, and outputs the image.

In this manner, when a marker denoting a segmentation of the data stream which is necessary for obtaining the decoding image is specified in the control unit 45, it is possible to supply only the data stream which is necessary for obtaining the decoding image in the decoding target region to the decoding processing unit 30. Accordingly, it is possible to further reduce the data amount to be supplied to the decoding processing unit 30 compared to the third operation. Accordingly, it is possible to efficiently perform the decoding processing. In addition, as shown in the third operation, the marker located on the right side is also specified, in addition to the restart marker which is located on the left side of the decoding target region in order to cut out a necessary region from a data stream.

Figure 12:
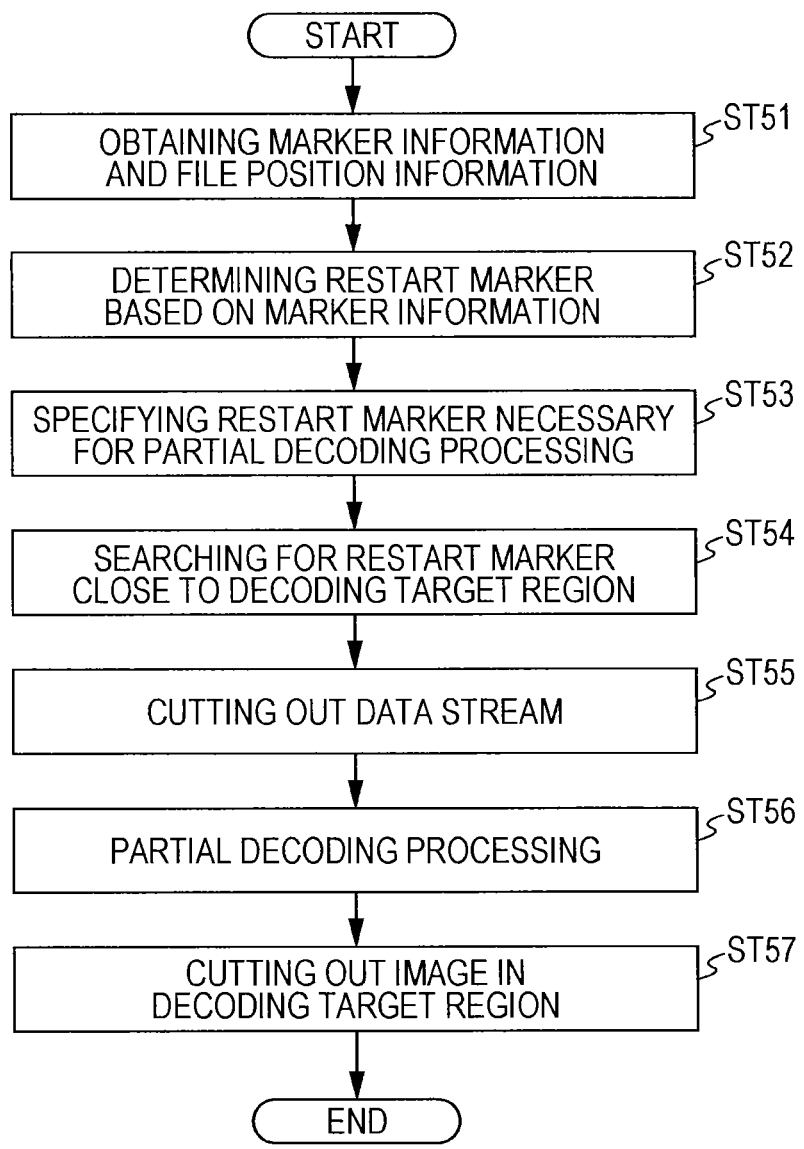
FIG. 12 is a flowchart which illustrates a decoding operation in a case where a stream which is necessary for partial decoding processing is read out in the control unit.

FIG. 12 is a flowchart which illustrates a decoding operation when reading out a data stream which is necessary for performing the partial decoding processing in the control unit 45.

In step ST51, the control unit 45 obtains marker information, and file position information of a data stream, and proceeds to step ST52.

In step ST52, the control unit 45 determines a restart marker based on the marker information. The control unit 45 determines the restart marker in which the address is recorded based on the marker information, and proceeds to step ST53.

In step ST53, the control unit 45 specifies a restart marker which is necessary for performing the partial decoding processing. The control unit 45 specifies a marker denoting a segmentation of the data stream which is necessary for obtaining the decoding image in the decoding target region, and proceeds to step ST54. Here, in order to cut out only the necessary data, as described above, not only a marker corresponding to the start of the data stream which is necessary, but a marker corresponding to the end is also specified.

In step ST54, the control unit 45 searches for a restart marker in the vicinity of the decoding target region. The control unit 45 discriminates a position of the restart marker which is specified in step ST53 from a restart marker which is located on the right side of the restart marker which is specified on the start side of the data stream, and in which the address is not recorded based on the restart interval, or the thinning-out parameter. In addition, a restart marker which is located on the left side of the restart marker which is specified on the end side of the data stream, and in which the address is not recorded is determined. Further, the control unit 45 changes the restart marker which is specified, when the restart marker located on the left side and right side of the decoding target region, and is the closest is the restart marker in which the address is not recorded. The control unit 45 changes the restart marker which is specified to be necessary for the decoding processing in the decoding target region in step ST53 to the restart marker which is the closest, and proceeds to step ST55.

In step ST55, the control unit 45 performs cutting out of the data stream. The control unit 45 cuts out the data stream which is necessary for obtaining the decoding image in the decoding target region based on the specified restart marker, supplies the data stream to the decoding processing unit 30, and proceeds to step ST56.

In step ST56, the control unit 45 causes the partial decoding processing to be performed. The control unit 45 causes the decoding processing unit 30 to perform the partial decoding processing as the decoding processing of the data stream which is cut out in step ST55, and proceeds to step ST57.

In step ST57, the control unit 45 causes image cutting out to be performed in the decoding target region. The control unit 45 controls the operation of the decoding processing unit 30, cuts out an image in the decoding target region from the decoding image which is obtained by performing the partial decoding processing, and outputs an image signal of the cut out image.

By performing the processing in this manner, it is possible to further increase the data transmission efficiency, since only the data stream which is used in the partial decoding processing is supplied to the decoding processing unit 30.

6. Fifth Operation of Image Processing Device

Figure 13:
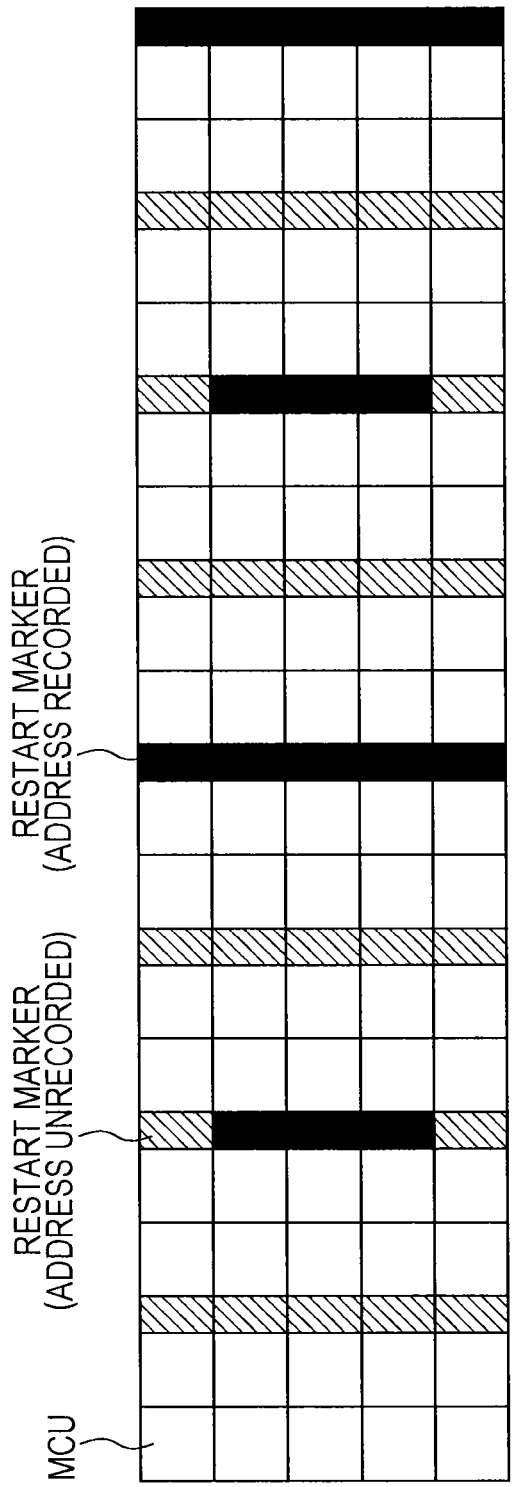
FIG. 13 is a diagram which exemplifies a case in which recording intervals of addresses of restart markers are varied in one image.

In the above-described operation, a case has been exemplified in which a change in a recording interval (marker thinning-out interval) in one image is not performed with respect to the address of the restart marker. However, the recording interval may be varied in one image by changing the thinning parameter. Subsequently, as the fifth operation, a case in which the recording interval is variable in one image will be described. FIG. 13 exemplifies a case in which the recording interval of the address of the restart marker is varied in one image. In addition, even in FIG. 13, the black portion denotes a restart marker in which the address is recorded, and the shade portion denotes a restart marker in which the address is not recorded.

In imaged images or the like, a desired subject is rarely located on an end portion side of an image. That is, the decoding target region is assumed to be set on the center portion side rather than the end portion side of the image. For this reason, for example, a recording interval is set to be wide in a region on the end portion side of the image, and is set to be narrow in the center region of the image. In this manner, if the recording interval is varied, for example, when a partial decoding region is provided in the center region of an image, the ratio at which restart markers in which addresses are recorded is specified becomes high, accordingly, cutting out of a stream for performing the partial decoding processing or the like becomes easy. In addition, in FIG. 13, a case is exemplified in which the thinning-out parameter in a region of the end of the image is set to RSTm_addr_interval=4, and the thinning-out parameter in the center region of the image is set to RSTm_addr_interval=2.

Figure 14:
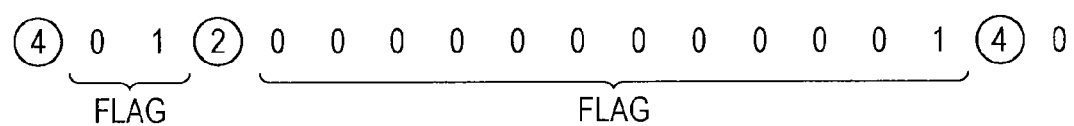
FIG. 14 is a diagram which describes a method of providing a plurality of thinning-out parameters.

When the recording interval is varied, a plurality of thinning-out parameters may be set. A method of setting the plurality of thinning-out parameters can be realized, for example, using an encoding technology in the related art. For example, a flag denoting whether or not the recording interval is varied is provided, and when the recording interval is changed, the flag is set to the changed recording interval, and subsequently, the recording interval is added. FIG. 14 exemplifies a case in which the recording interval is varied as shown in FIG. 13. In addition, in FIG. 14, numbers denoted by the circle denote the recording interval. In addition, the other numbers denote the flag, and when the recording interval is changed, the flag is set to "1". In addition, the flag corresponds to the restart marker in which the address is recorded. When the recording interval is "4", and the flag is "01", the recording interval is set to "4", and address recording of the restart marker is performed. When there are two restart markers in which the addresses are recorded, since the flag corresponding to the restart markers is "1", the recording interval is changed, and is set to "2". Accordingly, the recording interval is changed from "4" to "2", and address recording of the subsequent restart marker is performed. In addition, when the flag is "000000000001", and the restart markers in which the addresses are recorded are 12, since the flag corresponding to the restart markers is "1", the recording interval is changed, and the recording interval is set to "4". In this manner, it is possible to reliably determine that the recording interval is varied.

In addition, a series of processes which have been described in the specification can be executed using hardware, software, or a complex configuration of both. When the process is executed using software, a program in which a processing sequence is recorded is installed in a memory in a computer which is embedded in dedicated hardware, thereby executing the process. Alternatively, it is possible to execute the process by installing a program in a general-purpose computer which is able to execute various processes.

For example, the program can be recorded in advance on a hard disk, or a ROM (Read Only Memory) as a recording medium. Alternatively, the program can be temporarily, or permanently stored (recorded) on a removable recording medium such as a flexible disk, a CD-ROM (Compact Disc Read Only Memory), MO (Magneto optical) disc, a DVD (Digital Versatile Disc), a magnetic disk, a semiconductor memory card, or the like. Such a removable recording medium can be provided as so-called package software.

In addition, the program may be transmitted to a computer wirelessly, or using a wire through a network such as a LAN (Local Area Network), the Internet, or the like, from a download site, in addition to installing in a computer from the removable recording medium. The computer is able to receive the program which is transmitted in that manner, and to install the program on the recording medium such as an embedded hard disk or the like.

In addition, the present technology is not be construed by being limited to the above-described embodiments. In the embodiments of the technology, the present technology is disclosed as examples, and it is clear that a person skilled in the art can perform modifications, or substitutions of the embodiments without departing from the scope of the present technology. That is, in order to determine the scope of the present technology, it is necessary to refer to claims.

In addition, the image processing device in the present technology may be configured as follows.

(1) An image processing device which includes an encoding processing unit which generates a data stream in which markers denoting segmentation of image encoding processing are inserted, and a marker information generation unit which generates marker information which is provided with position information denoting a position in the data stream of a selected marker with a predetermined marker thinning-out interval from the markers which are inserted.

(2) The image processing device which is disclosed in (1), in which the marker information generation unit provides information denoting a marker thinning-out interval to the marker information.

(3) The image processing device which is disclosed in any of (1) and (2), in which the marker information generation unit sets the marker thinning-out interval so that the selected markers are aligned in a vertical direction.

(4) The image processing device which is disclosed in any of (1) to (3), in which the marker information generation unit sets orders of the selected markers in the vertical direction, and generates position information denoting a position in the data stream using the order of markers.

(5) The image processing device which is disclosed in any of (1) to (4), in which the encoding processing unit connects the maker information to the data stream.

(6) The image processing device which is disclosed in any of (1) to (4), in which the marker information generation unit sets the generated marker information to be a separate file from the data stream, and the encoding processing unit includes information denoting a location of the file in the data stream.

(7) The image processing device which is disclosed in any of (1) to (6), in which the marker information generation unit provides information denoting whether or not the marker thinning-out interval is changed to the marker information by setting the marker thinning-out interval to be variable.

The present disclosure contains subject matter related to that disclosed in Japanese Priority Patent Application JP 2011-275562 filed in the Japan Patent Office on Dec. 16, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   circuitry configured to
   generate a data stream in which markers denoting segmentation of image encoding processing are inserted, and
   generate marker information which is provided with position information denoting a position in the data stream of a selected marker, having a predetermined marker thinning-out interval, from the markers which are inserted.

2. The image processing device according to claim 1, wherein the circuitry is further configured to provide information denoting the marker thinning-out interval to the marker information.

3. The image processing device according to claim 1, wherein the circuitry is further configured to set the marker thinning-out interval so that the selected markers are aligned in a vertical direction.

4. The image processing device according to claim 1, wherein the circuitry is further configured to set orders of the selected markers in the vertical direction, and generate position information denoting positions in the data stream using the order of markers.

5. The image processing device according to claim 1, wherein the circuitry is further configured to connect the maker information to the data stream.

6. The image processing device according to claim 1, wherein the circuitry is further configured to set the generated marker information to be a separate file from the data stream, and
   wherein the circuitry is further configured to include information denoting a location of the file in the data stream.

7. The image processing device according to claim 1, wherein the circuitry is further configured to provide information denoting whether or not the marker thinning-out interval is changed to the marker information by setting the marker thinning-out interval to be variable.

8. A method of image processing comprising:
   generating a data stream in which markers denoting segmentation of image encoding processing are inserted; and
   generating marker information that is provided with position information denoting a position of a marker, which is selected from the inserted markers and has a predetermined marker thinning-out interval.

9. A non-transitory computer readable medium storing a program that when executed causes a computer to execute a method comprising procedures of:
   generating a data stream in which markers denoting segmentation of image encoding processing are inserted; and
   generating marker information that is provided with position information denoting a position of a marker, which is selected from the inserted markers and has a predetermined marker thinning-out interval.

10. An image processing device comprising:
    circuitry configured to
    specify a marker denoting segmentation of a data stream which is necessary for obtaining a decoding image in a decoding target region based on marker information which is provided with position information denoting a position in the data stream with respect to a marker which is selected with a predetermined marker thinning-out interval in the data stream in which a marker denoting segmentation of image encoding processing is inserted, and
    perform decoding of only a data stream which is necessary for obtaining the decoding image using the specified marker, and cuts out an image in the decoding target region from the obtained decoding image.

11. The image processing device according to claim 10, wherein the circuitry is further configured to specify the marker denoting the segmentation of a data stream which is necessary for obtaining a decoding image in the decoding target region from the selected marker.

12. The image processing device according to claim 11, wherein the circuitry is further configured to search for a marker which is closer to the decoding target region than the specified marker from markers which are not selected, based on marker information in which the position information, and information denoting the marker thinning-out interval are provided, and when the marker which is close to the decoding target region is detected, the specified marker is changed to the detected marker.

13. A method of image processing comprising:
    specifying a marker denoting segmentation of a data stream which is necessary for obtaining a decoding image in a decoding target region based on marker information which is provided with position information denoting a position in the data stream with respect to a marker which is selected with a predetermined marker thinning-out interval in a data stream in which markers denoting segmentation of image encoding processing are inserted; and cutting out an image in the decoding target region from an obtained decoding image by performing decoding only for a data stream which is necessary for obtaining a decoding image in the decoding target region using the specified marker.

14. A non-transitory computer readable medium having stored thereon a program which when executed by a computer causes a computer to execute a method comprising:

specifying a marker denoting segmentation of a data stream which is necessary for obtaining a decoding image in a decoding target region based on marker information which is provided with position information denoting a position in the data stream with respect to a marker which is selected with a predetermined marker thinning-out interval in a data stream in which markers denoting segmentation of image encoding processing are inserted; and cutting out an image in the decoding target region from an obtained decoding image by performing decoding only for a data stream which is necessary for performing decoding in the decoding target region using the specified marker.

* * * * *